T. E. MURRAY, Jr.
METHOD OF AND APPARATUS FOR ELECTRICALLY WELDING PLATES OR BARS TOGETHER.
APPLICATION FILED JULY 13, 1917.
1,252,146.
Patented Jan. 1, 1918.
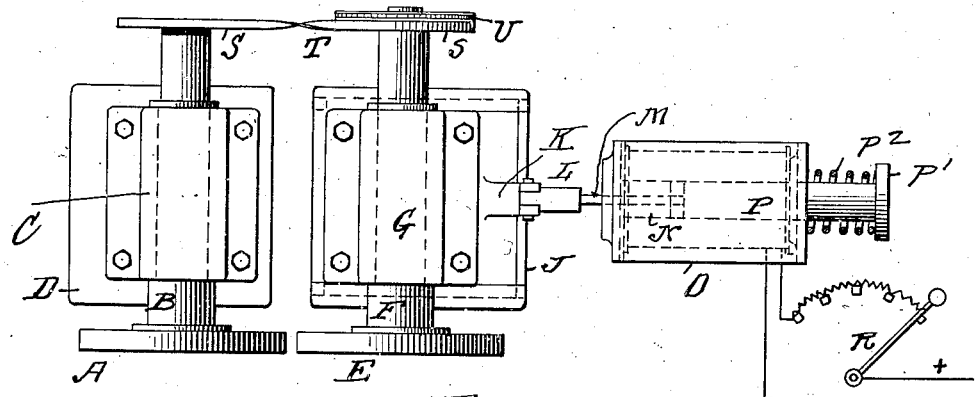
Fig. 1.
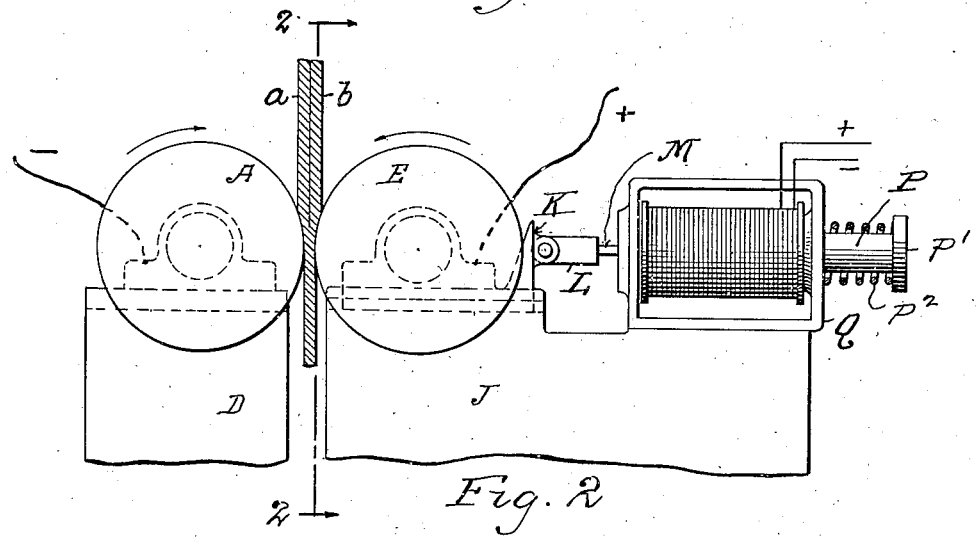
Fig. 2.
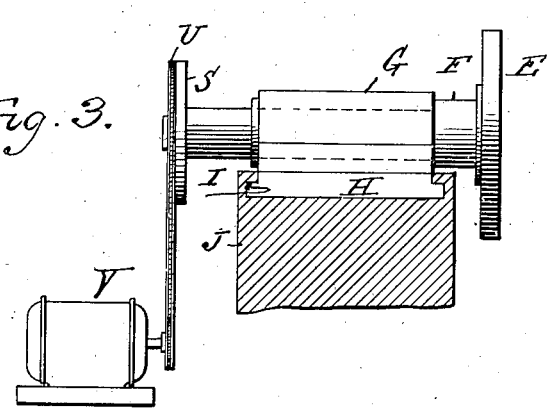
Fig. 3.
Fig. 4.
INVENTOR
Thomas E. Murray Jr
BY Park Benjamin
his ATTORNEY

UNITED STATES PATENT OFFICE.

THOMAS E. MURRAY, JR., OF BROOKLYN, NEW YORK.

METHOD OF AND APPARATUS FOR ELECTRICALLY WELDING PLATES OR BARS TOGETHER.

1,252,146.     Specification of Letters Patent.     Patented Jan. 1, 1918.

Application filed July 13, 1917. Serial No. 180,285.

*To all whom it may concern:*

Be it known that I, THOMAS E. MURRAY, Jr., a citizen of the United States, residing at Brooklyn, in the county of Kings and State of New York, have invented a certain new and useful Improvement in Methods of and Apparatus for Electrically Welding Plates or Bars Together, of which the following is a specification.

The invention relates to the electric welding of plates or bars of metal disposed with their surfaces in contact. The surface of one plate may be wholly in contact with the surface of the other plate if one be of smaller area than the other, or if the areas be the same, both surfaces may be wholly in contact or one plate may partially overlap and make contact with the other. In any case, the joint is formed between the contacting surfaces.

My invention includes both a process and an apparatus whereby said process may be carried into effect, the said process and apparatus having for their object to soften the plates by the welding current to a plastic state while passing between rotating roll electrodes and simultaneously to press said plates between said electrodes, whereby the two plates are not only united, but by reason of the pressure are consolidated substantially into one homogeneous plate of a less thickness than that of said two plates. Where this consolidation occurs at a joint formed by partially overlapping two similar plates, the finished plate may present a substantially uniform surface, without ledges or irregularities.

In the accompanying drawings—

Figure 1 is a plan view of my electric welding machine. Fig. 2 is a side elevation. Fig. 3 is a section on the line 2, 2 of Fig. 2, the bars to be welded being omitted. Fig. 4 shows different ways of placing the plates to be welded in contact.

Similar letters of reference indicate like parts.

A is a roll electrode, the shaft B of which is journaled in a bearing C on the support D. E is a movable roll electrode, the shaft F of which is journaled in a bearing G, the base H of which enters under-cut ways I in the support J. On the base H is an upwardly extending arm K, to which is pivoted an enlargement L on the end of a rod M which extends through the short fixed core N of an electro-magnet O, and is attached to the inner end of the plunger armature P of said magnet. Magnet O is inclosed in a frame Q secured upon support J. In circuit with the magnet coil may be a variable resistance R. On the roll shafts B and F are pulleys S connected by a cross belt T. On shaft F, outside of its pulley S, is a sprocket pulley U which is driven by a chain belt from the electric motor V.

The shaft bearings C and G being respectively connected to terminals of the welding circuit, the two bars or plates $a$, $b$ to be welded are placed with their surfaces in contact and introduced between the rolls A, E. The electro-magnet O being energized, attracts its armature P, and so causes the bearing G to slide in its ways and so press said plates or bars $a$, $b$ between the rolls A, E. The motor V being set in motion and the welding circuit closed, the plates are drawn downward between the roll electrodes A, E, which rotate in opposite directions. The welding current then passes between said electrodes and through the plates $a$, $b$, thus heating and softening said plates to a plastic state, which plates while so softened are compressed condensed by the action of electro-magnet O, so that the thickness of the united plates is less than that of the two plates prior to welding and pressure. In other words, said two plates are caused to form substantially one plate, which in practice I have found may be but little, if any, thicker than one of the original plates.

The armature P of the electro-magnet projects beyond the coil, and has a head P', between which and said head is interposed a helical spring $P^2$ which when the magnet is deënergized retracts the armature and returns the sliding bearing G to normal position. By suitably adjusting the variable resistance R, I vary the pressure exerted by the magnet upon the work while passing between the roll electrodes. The pulley S on shaft B is preferably insulated from said shaft.

One of the two plates $a$, $b$ may be of less area than the other, as shown at $c$ in Fig. 4, or both may be of the same area and register, as shown at $d$, or one may partially overlap the other, as shown at $e$. In the latter case, owing to the softening and compression of the overlapping portions, the joint may become practically unnoticeable.

I claim:

1. The method of welding together bars or plates, which consists in subjecting said plates disposed in contact to incremental softening to a plastic state and simultaneous compression, whereby successive portions of said plates are condensed and reduced in thickness.

2. An apparatus for welding together bars or plates, comprising two roll electrodes receiving said plates between them, means for rotating said electrodes in opposite directions, and means for moving one of said electrodes to compress said plates to a reduced thickness during the passage of said plates between said electrodes.

3. An apparatus for welding together bars or plates as in claim 2, the said moving means comprising an electro-magnet having an armature connected to the movable electrode, and constructed when energized to move said electrode to compress said plates, as set forth.

4. An apparatus for welding together bars or plates as in claim 3, further comprising means for varying the compressive force exerted by said electro-magnet.

5. The method of uniting metal plates, which consists in subjecting said plates disposed in juxtaposition to incremental softening to a plastic state over an elongated fractional area extending from edge to edge of said juxtaposed plates, and simultaneously compressing said plates to condense the metal and to reduce the thickness of said plates over said area.

In testimony whereof I have affixed my signature in presence of two witnesses.

THOMAS E. MURRAY Jr.

Witnesses:
   GERTRUDE T. PORTER,
   MAY T. MCGARRY.